United States Patent
Sarkis et al.

(10) Patent No.: US 11,503,594 B1
(45) Date of Patent: Nov. 15, 2022

(54) SIDELINK RESOURCE SELECTION FOR DISCONTINUOUS RECEPTION

(71) Applicant: QUALCOMM Incorporated, San Diego, CA (US)

(72) Inventors: Gabi Sarkis, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/805,602

(22) Filed: Jun. 6, 2022

Related U.S. Application Data

(60) Provisional application No. 63/261,992, filed on Oct. 1, 2021.

(51) Int. Cl.
*H04W 72/04* (2009.01)
*H04W 76/28* (2018.01)

(52) U.S. Cl.
CPC ... *H04W 72/0446* (2013.01); *H04W 72/0406* (2013.01); *H04W 76/28* (2018.02)

(58) Field of Classification Search
CPC ......... H04W 72/0446; H04W 72/0406; H04W 76/28
See application file for complete search history.

(56) References Cited

U.S. PATENT DOCUMENTS

| | | | |
|---|---|---|---|
| 2021/0227604 A1* | 7/2021 | Huang | H04W 72/02 |
| 2022/0030661 A1* | 1/2022 | Jeong | H04W 72/0406 |

FOREIGN PATENT DOCUMENTS

| | | | |
|---|---|---|---|
| CN | 113645680 A | * | 11/2021 |
| WO | WO-2021180079 A1 | * | 9/2021 |
| WO | WO-2022065927 A1 | * | 3/2022 |
| WO | WO-2022086051 A1 | * | 4/2022 |

OTHER PUBLICATIONS

Vishnu Rajendran et al., 'SCUBA: An In-Device Multiplexed Protocol for Sidelink Communication on Unlicensed Bands', Nov. 15, 2021, IEEE Internet of Things Journal, vol. 8, No. 22, pp. 16637-16652. (Year: 2021).*

* cited by examiner

*Primary Examiner* — Melvin C Marcelo
(74) *Attorney, Agent, or Firm* — Harrity & Harrity, LLP\Qualcomm

(57) ABSTRACT

Various aspects of the present disclosure generally relate to wireless communication. In some aspects, a first user equipment (UE) may provide, to a physical layer from a higher layer, an indication of a set of sidelink resources or slots that are for an active time of a discontinuous reception (DRX) cycle of a second UE or destination identifier (ID) and that are not for an inactive time of the DRX cycle of the second UE or destination ID. The first UE may transmit, to the second UE or one or more UEs associated with the destination ID, a sidelink communication that is based at least in part on the set of sidelink resources or slots. Numerous other aspects are described.

30 Claims, 11 Drawing Sheets

SIDELINK RESOURCE SELECTION FOR DISCONTINUOUS RECEPTION

CROSS-REFERENCE TO RELATED APPLICATION

This Patent Application claims priority to U.S. Provisional Patent Application No. 63/261,992, filed on Oct. 1, 2021, entitled "SIDELINK RESOURCE SELECTION FOR DISCONTINUOUS RECEPTION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for selecting sidelink resources for discontinuous reception.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
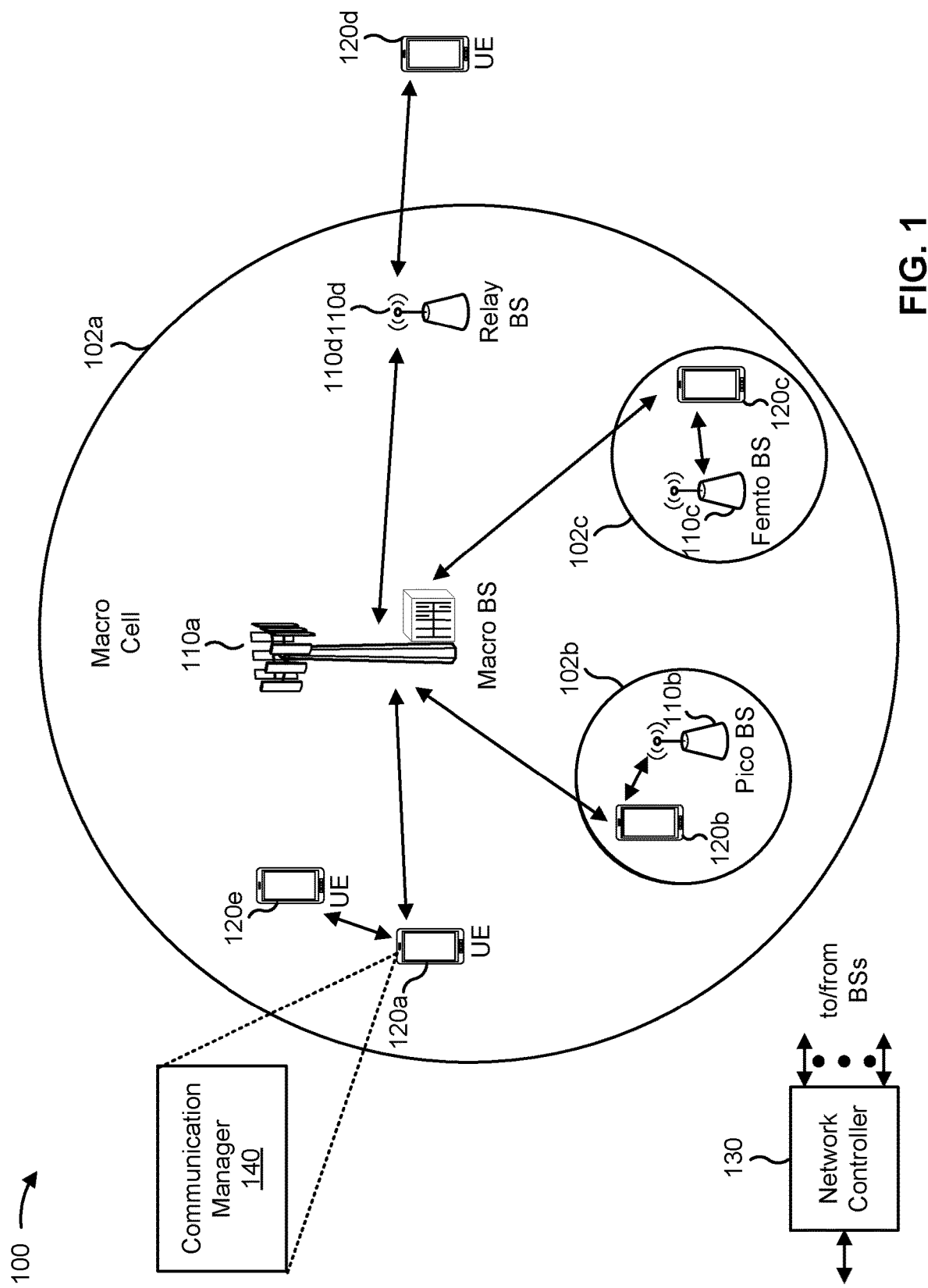
FIG. 1 is a diagram illustrating an example of a wireless network, in accordance with the present disclosure.

Some aspects described herein relate to a method of wireless communication performed by a first user equipment (UE). The method may include providing, to a physical layer from a higher layer, an indication of a set of sidelink resources or slots that are for an active time of a discontinuous reception (DRX) cycle of a second UE or destination identifier (ID) and that are not for an inactive time of the DRX cycle of the second UE or destination ID. The method may include transmitting, to the second UE or one or more UEs associated with the destination ID, a sidelink communication that is based at least in part on the set of sidelink resources or slots.

Some aspects described herein relate to a method of wireless communication performed by a first UE. The method may include generating, at a physical layer, a set of candidate sidelink resources. The method may include providing the set of candidate sidelink resources from the physical layer to a higher layer. The method may include selecting, at the higher layer, sidelink resources for one or more transmissions that are within an active time of a DRX cycle of a second UE or destination ID and that are not within an inactive time of the DRX cycle of the second UE or destination ID.

Some aspects described herein relate to a first UE for wireless communication. The first UE may include a memory and one or more processors coupled to the memory. The one or more processors may be configured to provide, to a physical layer from a higher layer, an indication of a set of sidelink resources or slots that are for an active time of a DRX cycle of a second UE or destination ID and that are not for an inactive time of the DRX cycle of the second UE or destination ID. The one or more processors may be configured to transmit, to the second UE or one or more UEs associated with the destination ID, a sidelink communication that is based at least in part on the set of sidelink resources or slots.

Some aspects described herein relate to a first UE for wireless communication. The first UE may include a memory and one or more processors coupled to the memory. The one or more processors may be configured to generate, at a physical layer, a set of candidate sidelink resources. The one or more processors may be configured to provide the set of candidate sidelink resources from the physical layer to a higher layer. The one or more processors may be configured to select, at the higher layer, sidelink resources for one or more transmissions that are within an active time of a DRX cycle of a second UE or destination ID and that are not within an inactive time of the DRX cycle of the second UE or destination ID.

Some aspects described herein relate to a non-transitory computer-readable medium that stores a set of instructions for wireless communication by a first UE. The set of instructions, when executed by one or more processors of the first UE, may cause the first UE to provide, to a physical layer from a higher layer, an indication of a set of sidelink resources or slots that are for an active time of a DRX cycle of a second UE or ID and that are not for an inactive time of the DRX cycle of the second UE or destination ID. The set of instructions, when executed by one or more processors of the UE, may cause the UE to transmit, to the second UE or one or more UEs associated with the destination ID, a sidelink communication that is based at least in part on the set of sidelink resources or slots.

Some aspects described herein relate to a non-transitory computer-readable medium that stores a set of instructions for wireless communication by a first UE. The set of instructions, when executed by one or more processors of the first UE, may cause the first UE to generate, at a physical layer, a set of candidate sidelink resources. The set of instructions, when executed by one or more processors of the first UE, may cause the first UE to provide the set of candidate sidelink resources from the physical layer to a higher layer. The set of instructions, when executed by one or more processors of the first UE, may cause the first UE to select, at the higher layer, sidelink resources for one or more transmissions that are within an active time of a DRX cycle of a second UE or destination ID and that are not within an inactive time of the DRX cycle of the second UE or destination ID.

Some aspects described herein relate to a first apparatus for wireless communication. The first apparatus may include means for providing, to a physical layer from a higher layer, an indication of a set of sidelink resources or slots that are for an active time of a DRX cycle of a second apparatus or destination ID and that are not for an inactive time of the DRX cycle of the second apparatus or destination ID. The first apparatus may include means for transmitting, to the second apparatus or one or more UEs associated with the destination ID, a sidelink communication that is based at least in part on the set of sidelink resources or slots.

Some aspects described herein relate to a first apparatus for wireless communication. The first apparatus may include means for generating, at a physical layer, a set of candidate sidelink resources, means for providing the set of candidate sidelink resources from the physical layer to a higher layer, and means for selecting, at the higher layer, sidelink resources for one or more transmissions that are within an active time of a DRX cycle of a second apparatus or destination ID and that are not within an inactive time of the DRX cycle of the second apparatus or destination ID.

Some aspects described herein relate to an apparatus for wireless communication. The apparatus may include means for selecting, based at least in part on channel sensing, one or more subchannels for transmitting information for coordinating sidelink resources with one or more other apparatuses. The apparatus may include means for transmitting, to at least another apparatus, sidelink control information (SCI) that indicates the one or more subchannels and one or more data transmission occasions in which the information is to be transmitted.

Aspects generally include a method, apparatus, system, computer program product, non-transitory computer-readable medium, user equipment, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a ULE 120d, and a ULE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may provide, to a physical layer from a higher layer, an indication of a set of sidelink resources or slots that are for an active time of a discontinuous reception (DRX) cycle of a second UE or destination identifier (ID) and that are not for an inactive time of the DRX cycle of the second UE or destination ID. A destination ID may correspond to one or more UEs. The communication manager 140 may transmit, to the second UE or one or more UEs associated with the destination ID, a sidelink communication that is based at least in part on the set of sidelink resources or slots.

In some aspects, the UE 120 may generate, at a physical layer, a set of candidate sidelink resources and provide the set of candidate sidelink resources from the physical layer to a higher layer. The communication manager 140 may select, at the higher layer, sidelink resources for one or more transmissions that are within an active time of a DRX cycle of a second UE or destination ID and that are not within an inactive time of the DRX cycle of the second UE or destination ID. Additionally, or alternatively, the communication manager 140 may perform one or more other operations described herein.

As indicated above, FIG. 1 is provided as an example. Other examples may differ from what is described with regard to FIG. 1.

Figure 2:
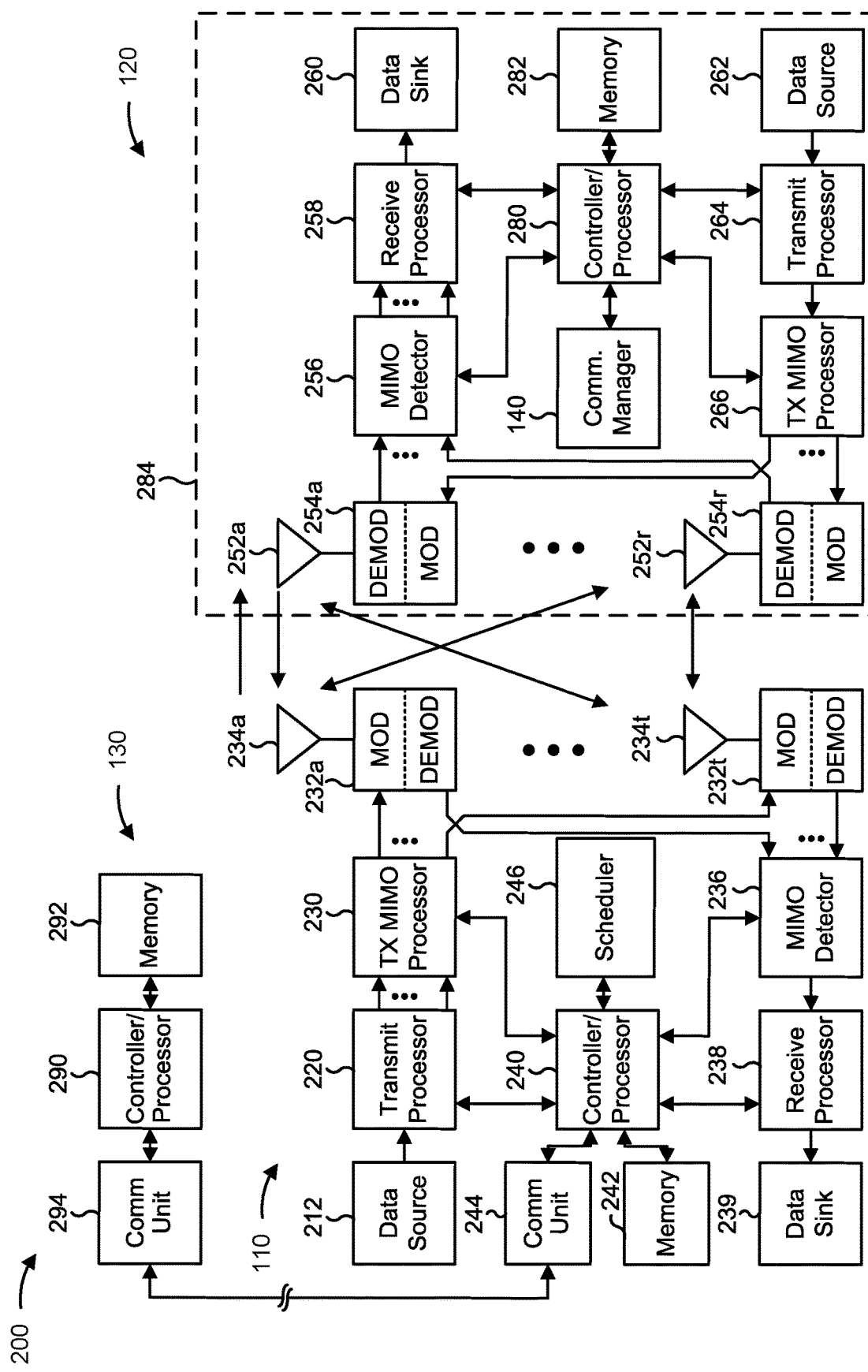
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R>1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-11).

The controller/processor 240 of the base station 110, the controller/processor 280 of the UE 120, and/or any other component(s) of FIG. 2 may perform one or more techniques associated with selecting sidelink resources for a UE that is configured for DRX, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, and/or other processes as described herein. In some examples, executing instructions may include running the instructions, converting the instructions, compiling the instructions, and/or interpreting the instructions, among other examples.

In some aspects, a first UE (e.g., UE 120) includes means for providing, to a physical layer from a higher layer, an indication of a set of sidelink resources or slots that are for an active time of a DRX cycle of a second UE or destination ID and that are not for an inactive time of the DRX cycle of the second UE or destination ID; and/or means for transmitting, to the second UE or one or more UEs associated with the destination ID, a sidelink communication that is based at least in part on the set of sidelink resources or slots. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a first UE (e.g., UE 120) includes means for generating, at a physical layer, a set of candidate sidelink resources; means for providing the set of candidate sidelink resources from the physical layer to a higher layer; and/or means for selecting, at the higher layer, sidelink resources for one or more transmissions that are within an active time of a DRX cycle of a second UE or destination ID and that are not within an inactive time of the DRX cycle of the second UE or destination ID. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
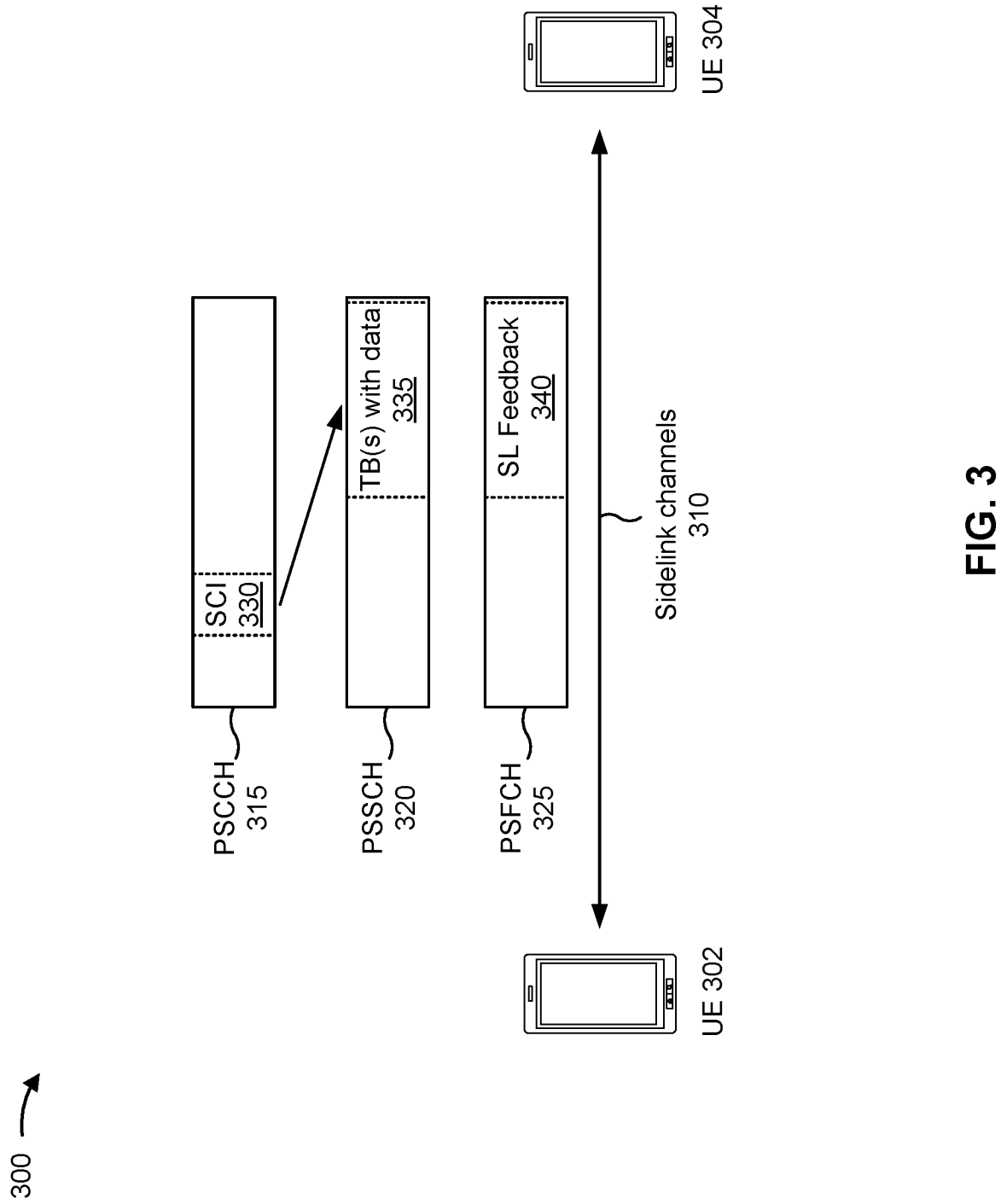
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 302 (e.g., UE 120e) may communicate with a second UE 304 (e.g., UE 120a) (and one or more other UEs) via one or more sidelink channels 310. UE 302 and UE 304 may communicate using the one or more sidelink channels 310 for P2P communications, D2D communications, V2X communications (e.g., which may include V2V communications, V2I communications, and/or V2P communications) and/or mesh networking. In some aspects, UE 302 and UE 304 may correspond to one or more other UEs. In some aspects, the one or more sidelink channels 310 may use a PC5 interface and/or may operate in a high frequency band (e.g., the 5.9 gigahertz (GHz) band). Additionally, or alternatively, UE 302 and UE 304 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station (e.g., base station 110) via an access link or an access channel. The PSSCH 320 may be used to communicate data, similar to a physical downlink shared channel (PDSCH) and/or a physical uplink shared channel (PUSCH) used for cellular communications with a base station via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, UE 304 may operate using a transmission mode where resource selection and/or scheduling is performed by UE 302 (e.g., rather than a base station). In some aspects, UE 302 and/or UE 304 may perform resource selection and/or scheduling by sensing channel availability for transmissions. For example, UE 304 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and/or may determine a signal-to-interference ratio (SIR) associated with another UE on a sidelink channel. UE 304 may select a channel for transmission of a sidelink communication based at least in part on the measurement(s).

Additionally, or alternatively, UE 304 may perform resource selection and/or scheduling using SCI 330 received in the PSCCH 315, which may indicate occupied resources and/or channel parameters. Additionally, or alternatively, UE 304 may perform resource selection and/or scheduling by determining a channel busy rate (CBR) associated with various sidelink channels, which may be used for rate control (e.g., by indicating a maximum number of resource blocks that UE 304 can use for a particular set of subframes).

In the transmission mode where resource selection and/or scheduling is performed by UE 302, UE 302 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, UE 302 may generate a sidelink grant that indicates one or more parameters for semi-persistent scheduling (SPS), such as a periodicity of a sidelink transmission. Additionally, or alternatively, UE 302 may generate a sidelink grant for event-driven scheduling, such as for an on-demand sidelink message.

UE 302 and UE 304 may operate in sidelink resource allocation Mode 2, in which UE 302 and UE 304 schedule or reserve their own sidelink resources without the assistance or direction of a base station (Mode 1). In some aspects, UE 302 may indicate available sidelink resources to UE 304, and UE 304 may select a sidelink resource for transmission from these available sidelink resources. UE 304 may also sense one or more of the sidelink channels 310 to determine which sidelink resources are available. UE 304 may select a sidelink resource for transmission from the sidelink resources that UE 302 indicates as available and/or from the sidelink resources that UE 304 senses are available.

As described in various aspects herein, UE 302 may schedule one or more preferred sidelink resources on behalf of UE 304.

As indicated above, FIG. 3 is provided as an example. Other examples may differ from what is described with regard to FIG. 3.

Figure 4:
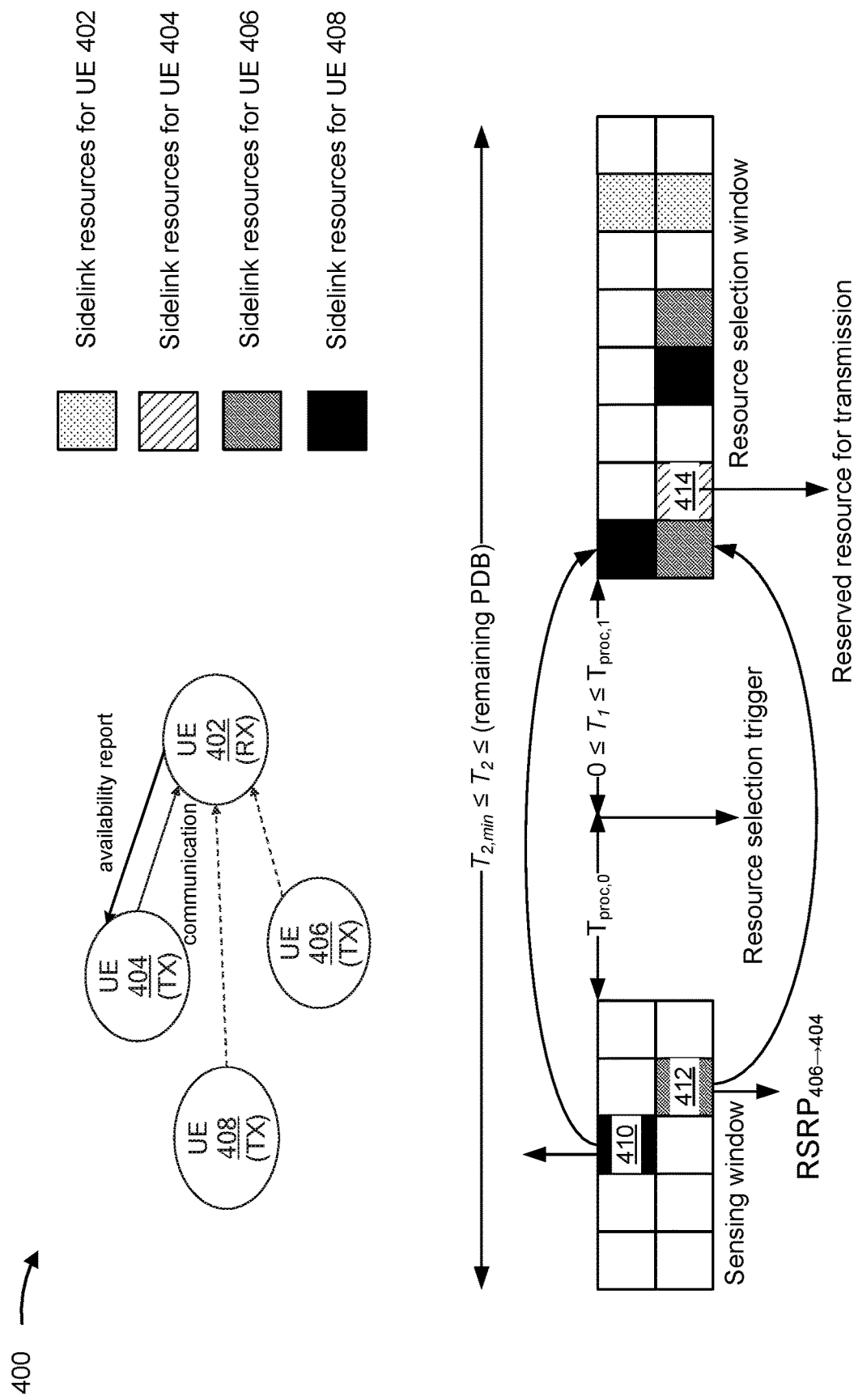
FIG. 4 is a diagram illustrating an example of selecting sidelink resources, in accordance with the present disclosure.

FIG. 4 is a diagram illustrating an example 400 of selecting sidelink resources, in accordance with the present disclosure. Example 400 shows a UE 402 (e.g., a UE 302) that may receive communications on a sidelink channel from other UEs (e.g., a UE 304), such as UE 404, UE 406, and/or UE 408.

As described in connection with FIGS. 4-8, UE 404 is a transmitting UE that is transmitting communications to UE 402, which is a receiving UE. UE 404 may use a report from UE 402, which may act as a reporting UE that reports available sidelink resources, preferred sidelink resources, non-preferred sidelink resources, or sidelink resource conflicts. Example 400 shows an availability report from UE 402 to UE 404 and a communication from UE 404 to UE 402.

If UE 404 is to transmit a communication to UE 402, UE 404 may sense the sidelink channel in a sensing window to determine which sidelink resources (e.g., subcarriers, sub-channels) are available. A sidelink resource may be considered available if the sidelink resource was clear or had a signal energy (e.g., RSRP) that satisfied an availability threshold (e.g., measured interference or energy on the channel is lower than a maximum decibel-milliwatts (dBm) or dB, RSRP threshold). The availability threshold may be configured or preconfigured per transmission priority and receive priority pair. UE 404 may measure DMRSs on a PSCCH or a PSSCH, according to a configuration.

For example, UE 404 may prepare to transmit a communication to UE 402. UE 404 may have already sensed previous sidelink resources and successfully decoded SCI from UE 406 and UE 408. UE 404 may try to reserve sidelink resources, and thus may check the availability of the future sidelink resources reserved by UE 406 and UE 408 by sensing the sidelink channel in the sensing window. UE 404 may measure an RSRP of a signal from UE 408 in sidelink resource 410, and an RSRP of a signal from UE 406 in sidelink resource 412. If an observed RSRP (RSRP projection) satisfies the RSRP threshold (e.g., is lower than a maximum RSRP), the corresponding sidelink resource may be available for reservations by UE 404. UE 404 may reserve the sidelink resource (which may be a random selection from available resources). For example, UE 404 may select and reserve sidelink resource 414 for transmission. This may be in a time slot after which UE 406 and UE 408 had used sidelink resources, and UE 404 may have sensed these sidelink resources earlier. UE 404 may select and reserve sidelink resources only upon reaching a threshold level (e.g., 20%, 30%, or 50% availability). UE 404 may increase or decrease the RSRP threshold as necessary to arrive at the threshold level. UE 404 may select and reserve sidelink resources in the current slot and up to two (or more) future slots. Reservations may be aperiodic or periodic (e.g., SCI signals period between 0 ms and 1000 ms). Periodic resource reservation may be disabled.

There may be a resource selection trigger to trigger selection of sidelink resources after a processing time $T_{proc,0}$, and before another processing time $T_{proc,1}$ before a resource selection window from which sidelink resources are available. The resource selection window may be a time window from which sidelink resources may be selected, and the resource selection window may extend for a remaining packet delay budget (PDB).

UE 404 may be power-sensitive and thus may not afford to continually sense all of the sidelink resources. UE 402 may be more capable of sensing and reporting on the sidelink resources because, for example, UE 402 may be a smart phone while UE 404 may be a smart watch. UE 402 may receive unicast communications from UE 404, and UE 402 may report back available resources to UE 404. UE 402 may continually sense the sidelink resources and measure interference levels involving neighboring UEs. For example, UE 402 may measure an RSRP of a signal from neighboring UE 406 as −92 dBm and an RSRP of a signal from neighboring UE 408 as −102 dBm. For a signal of a last transmission of UE 404, UE 402 measured a target signal level with an RSRP that was −90 dBm. UE 402 may estimate an SIR of a signal between UE 402 and UE 404 as −90−(−92)=2 dB and an SIR between UE 404 and UE 408 as −90−(−102)=12 dB. If the SIR of a signal from UE 404 to UE 402 with interference from UE 408 is large enough (satisfies an availability threshold) for reliable communication between UE 402 and UE 404, UE 402 may mark a sidelink resource that was reserved by UE 408 as available for use for a communication from UE 404 to UE 402. This may be useful when UE 404 has more than one data stream with varying Quality of Service (QoS) requirements or transmissions with different MCS indices.

UE 402 may transmit a report indicating an availability of each sidelink resource. Rows in the report may represent subcarriers or subchannels, and columns may represent time units (e.g., slots, symbols). The report may be a binary report, such as a bitmap. For example, UE 402 may report a 1 bit for available and a 0 bit for unavailable. UE 404 may decode the report and select (e.g., randomly) N resources from the available sidelink resources for potential N transmissions of a newly generated packet, or a packet of a transport block that has not been transmitted before. UE 404 may select N=4 sidelink resources from the available sidelink resources indicated by the report.

In some aspects, the report may involve different inter-UE coordination schemes that report different information. For example, the report may include information of Type A, which indicates one or more preferred sidelink resources for transmission. The report may include information of Type B, which indicates one or more non-preferred sidelink resources for transmission. The report may include information of Type C, which indicates expected, potential, or detected collisions of one or more sidelink resources. Information of Type A and Type B may be for a first inter-UE coordination scheme, and information of Type C may be for a second inter-UE coordination scheme. The report may involve down-selection in what resources are reported.

As indicated above, FIG. 4 is provided as an example. Other examples may differ from what is described with regard to FIG. 4.

Figure 5:
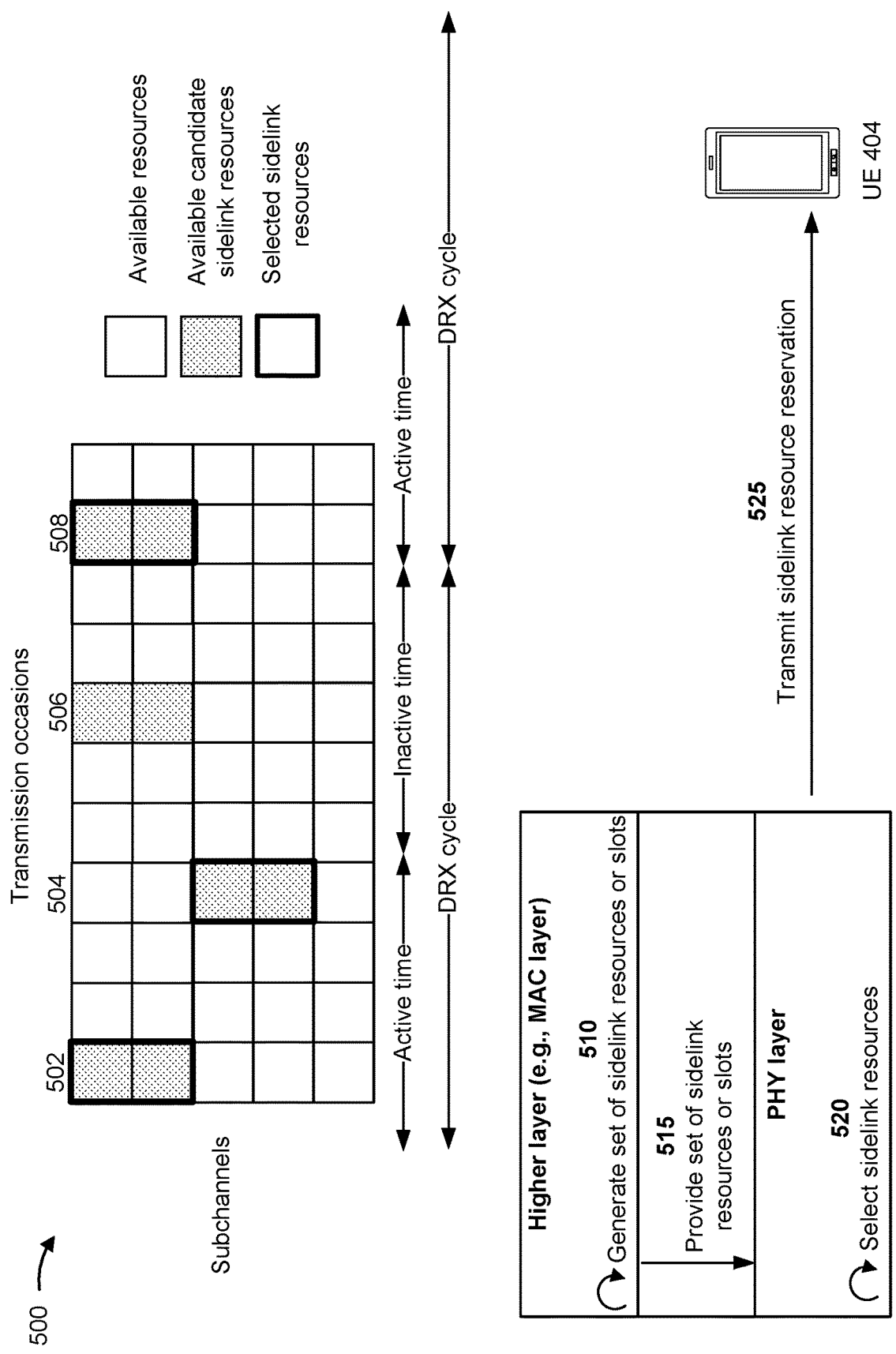
FIG. 5 is a diagram illustrating an example of selecting sidelink resources for a UE configured for discontinuous reception (DRX), in accordance with the present disclosure.

FIG. 5 is a diagram illustrating an example 500 of selecting sidelink resources for a UE configured for DRX, in accordance with the present disclosure. Example 500 shows that UE 402 and UE 404 may communicate (e.g., transmit an uplink transmission and/or receive a downlink transmission) with each other. As described in connection with FIG. 4, UE 402 is the reporting UE, and UE 404 is the transmitting UE that transmits a communication to UE 402 as the receiving UE. Example 700 shows the physical (PHY) layer of UE 402 and a higher layer of UE 402, such as the medium access control (MAC) layer, among other higher layers.

UE 404 may be configured to support DRX for sidelink communications, where UE 404 is only receiving for a portion of the time (active time). DRX may involve a DRX cycle of an active time and an inactive time. The DRX cycle may be offset from a reference point. During the active time, UE 404 may transmit or receive communications on sidelink resources as part of an ON duration. During the inactive time, UE 404 may not transmit communications on sidelink resources or receive any or more communications as part of an OFF duration. UE 404 may be configured with an inactivity timer. The inactivity timer starts for an active time period and runs for a specified duration while waiting for activity on the channel. If there is no activity upon expiration of the inactivity timer, the active time (and the ON duration) of the DRX cycle concludes. If a sidelink communication is received while the inactivity timer is running, UE 404 may reset and restart the inactivity timer. Example 500 shows an active time and an inactive time for a DRX cycle.

UE 404 may conserve processing resources by sleeping during the inactive time (OFF duration) of a DRX cycle. UE 404 is not able to transmit or receive sidelink communications while in sleep mode. Meanwhile, a PHY layer of UE 402 may select and reserve sidelink resources for UE 404. The sidelink resources may include resources on a subchannel and resources in time slots or during time occasions 502, 504, 506, and 508. However, if UE 404 sleeps according to a DRX configuration, the PHY layer of UE 402 may not be aware that UE 404 is configured for DRX or be aware of the DRX cycle of UE 404. UE 402 may reserve sidelink resources or transmit sidelink communications to UE 404 when UE 404 is in sleep mode in the DRX cycle. Because UE 404 does not receive and process reservations or communications transmitted by UE 402 during a sleep mode of the DRX cycle, those reservations or communications are wasted.

According to various aspects described herein, UE 402 may select sidelink resources that account for the DRX cycle of UE 404. For example, a higher layer (e.g., MAC layer) of UE 402 may be aware of the DRX cycle of UE 402 and may provide the PHY layer of UE 402 a set of sidelink resources or slots that account for the DRX cycle of UE 404. As shown by example 500, a possible set of candidate sidelink resources for UE 404 may include sidelink resources at time occasions, 502, 504, 506, and 508. While sidelink resources at time occasions 502, 504, and 508 occur during active times of the DRX cycle of UE 404, the sidelink resource at time occasion 506 occurs during an inactive time. To avoid wasting any communications signaled during time occasion 506, as shown by reference number 510, the higher layer of UE 402 may select, as a set of sidelink resources, any of the sidelink resources at time occasions 502, 504, and 508 and not select the sidelink resource at time occasion 506. The higher layer of UE 402 may also generate a set of slots (e.g., time slots, time occasions) to inform the PHY layer of when sidelink resource may be used or reserved. As shown by reference number 515, the higher layer of UE 402 may provide the set of sidelink resources or slots to the PHY layer. The set of sidelink resources or slots may be limited to a DRX ON duration and/or to the PDB.

The higher layer of UE 402 may provide an explicit set of sidelink resources or slots. The higher layer of UE 402 may provide an indication of one or more ranges of slots. This may include a first slot and a last slot. The higher layer of UE 402 may provide an indication of one or more ranges of time points. This may include a first time point and a last time point. The time points may include symbols, slots, minislots, absolute time points, and/or relative time points. In some aspects, the set of sidelink resources or slots may be provided per priority of a transmission, or for a subset of transmissions (or retransmissions). The subset of transmissions may be configured or preconfigured per resource pool or indicated via a radio resource control (RRC) message. UE 402 may obtain parameters by configuration from a base station or by preconfiguration (stored configuration information preloaded on the UE 402, such as in firmware). Note that only the initial transmission may need to be included within the set of sidelink resources or slots.

As shown by reference number 520, the PHY layer of UE 402 may select sidelink resources that are within the set of sidelink resources or slots. The PHY layer of UE 402 may reserve and/or use the selected sidelink resources. For example, the PHY layer of UE 402 may use the set of resources as the initial set of candidate sidelink resources for sidelink resource selection. Sidelink resource selection may include an initial sidelink resource selection or a sidelink resource reselection. The PHY layer of UE 402 may initialize a set of candidate sidelink resources using sidelink resources in the set of slots provided by the higher layer of UE 402.

As shown by reference number 525, the PHY layer of UE 402 may transmit a communication that includes a sidelink resource reservation of the sidelink resources to UE 404, or to one or more UEs associated with a destination ID. In some aspects, the PHY layer of UE 402 may transmit a sidelink communication (e.g., data, SCI) using a selected sidelink resource.

By obtaining information about the DRX cycle used by UE 404, the PHY layer of UE 402 may cause UE 402 to conserve processing resources and signaling resources that would otherwise be wasted by sidelink communications to UE 404 while UE 404 is asleep.

As indicated above, FIG. 5 is provided as an example. Other examples may differ from what is described with regard to FIG. 5.

Figure 6:
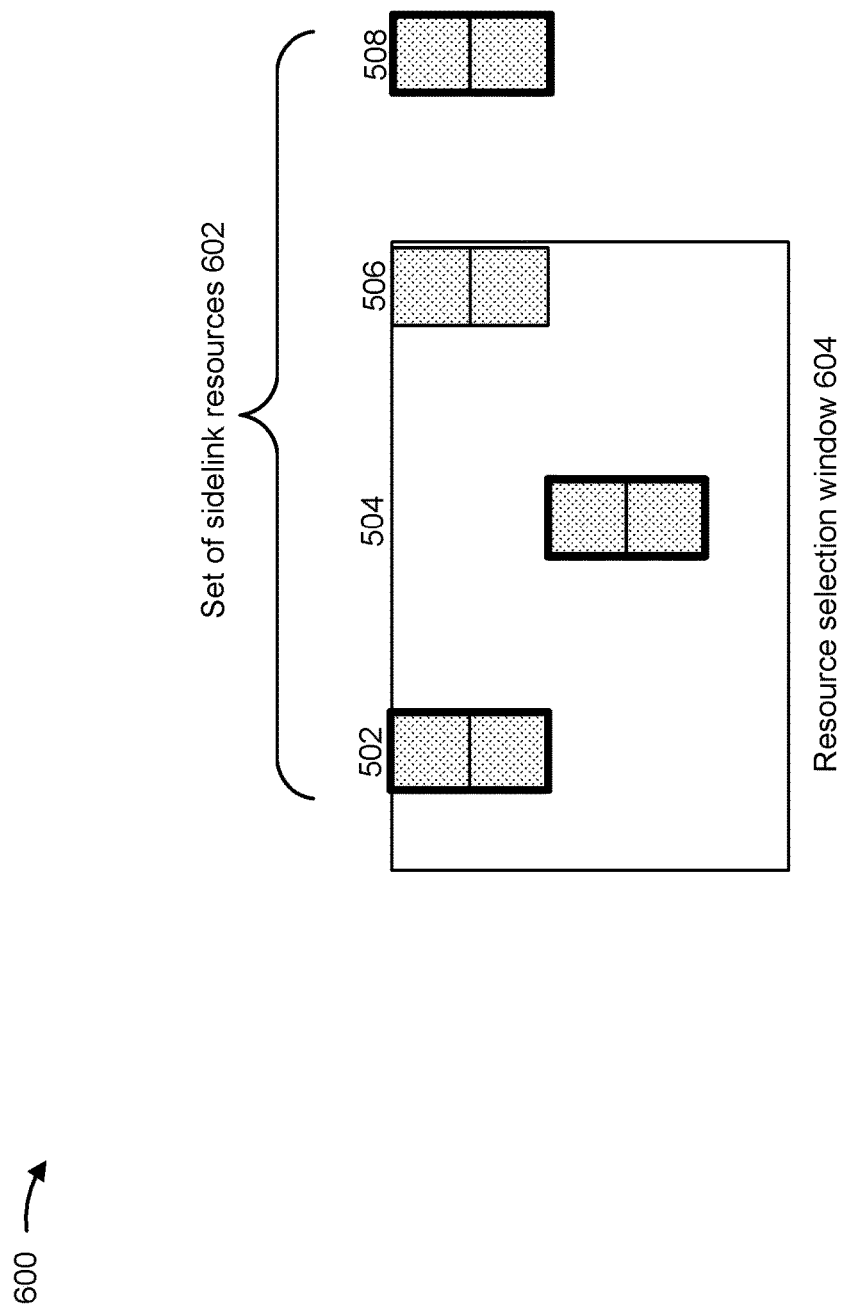
FIG. 6 is a diagram illustrating an example of selecting sidelink resources for a UE configured for DRX, in accordance with the present disclosure.

FIG. 6 is a diagram illustrating an example 600 of selecting sidelink resources for a UE configured for DRX, in accordance with the present disclosure.

The PHY layer of UE 402 may be provided a set of sidelink resources or slots, such as set of sidelink resources 602 shown in example 600. The PHY layer of UE 402 may also be aware of the resource selection window 604. In some aspects, the PHY layer of UE 402 may initialize a set of candidate sidelink resources with resources from the resource selection window 604 that are also in the provided set of sidelink resources 602. In other words, the PHY layer of UE 402 may use, for sidelink resource selection, sidelink resources that are both within the set of sidelink resources or slots and within a resource selection window as an initial set of candidate sidelink resources. For example, the set of sidelink resources 602 may include sidelink resources at time occasions 502, 504, 506, and 508. However, the sidelink resource at time occasion 508 does not fall within the resource selection window 604. That is, there is no overlap between the set of sidelink resources 602 and the resource selection window at time occasion 508. Accordingly, the PHY layer of UE 402 may select sidelink resources that are both within the set of sidelink resources 602 and within the resource selection window 604. This may include selecting sidelink resources of time occasions 502 and 504 from among the candidate sidelink resources of time occasions, 502, 504, and 506. The sidelink resource at time occasion 508 may not be selected.

As indicated above, FIG. 6 is provided as an example. Other examples may differ from what is described with regard to FIG. 6.

Figure 7:
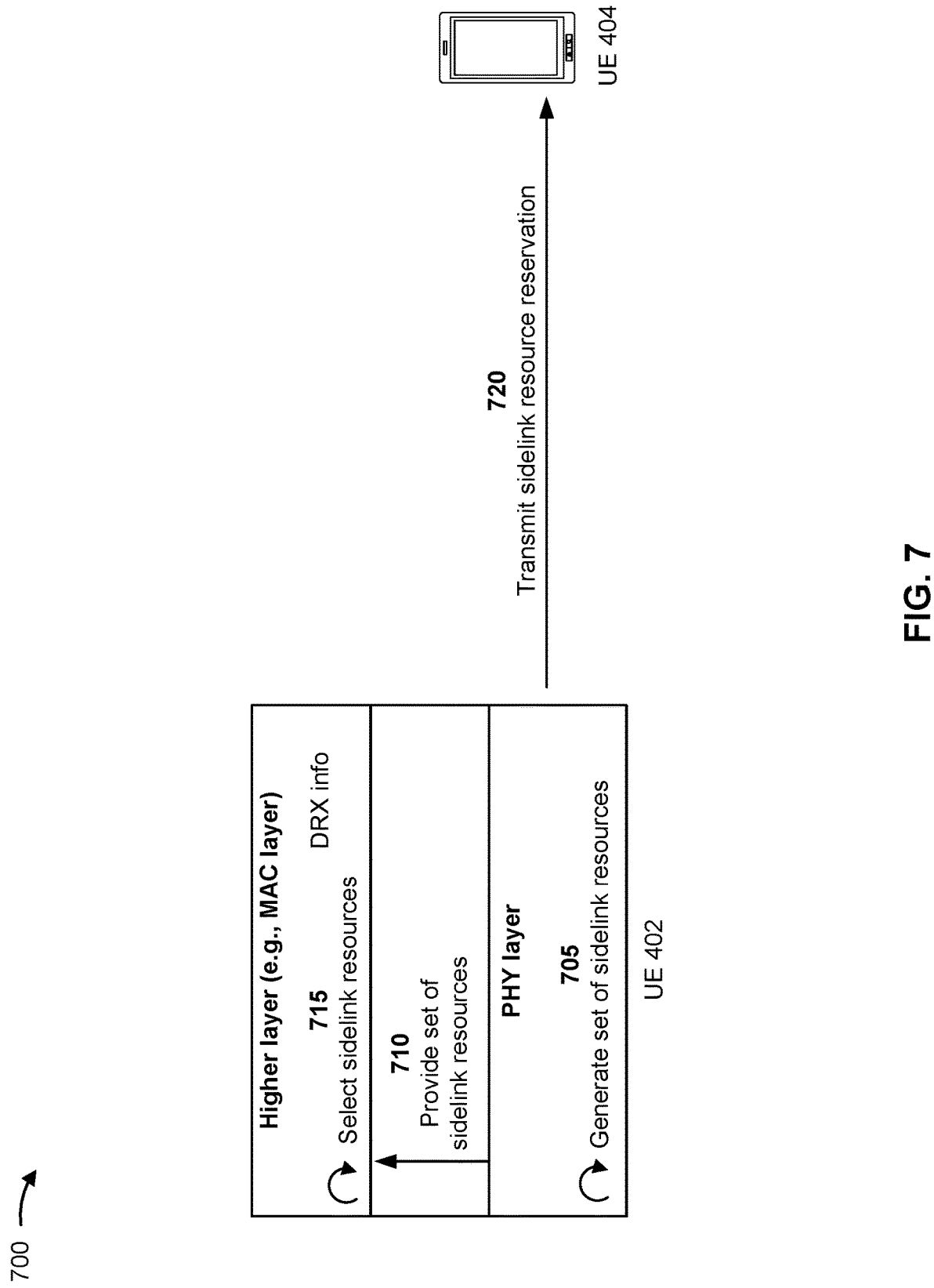
FIG. 7 is a diagram illustrating examples of selecting sidelink resources for a UE configured for DRX, in accordance with the present disclosure.

FIG. 7 is a diagram illustrating an example 700 of selecting sidelink resources for a UE configured for DRX, in accordance with the present disclosure. While FIG. 5 shows the higher layer of UE 402 providing a set of sidelink resources or slots to the PHY layer of UE 402, FIG. 7 shows the PHY layer of UE 402 providing a set of sidelink resources (e.g., initial set of candidate sidelink resources) to the higher layer of UE 402. That is, rather than the higher layer using information about the DRX cycle before initial candidate sidelink resource selection at the PHY layer, the higher layer in FIG. 6 is using the information about the DRX cycle after the initial candidate sidelink resource selection at the PHY layer. Example 700 shows a higher layer, such as the MAC layer, and the PHY layer of UE 402.

As shown by reference number 705, the PHY layer of UE 402 may generate a set of sidelink resources. The PHY layer may select an initial set of candidate sidelink resource or a later set of candidate sidelink resources. The PHY layer may also select sidelink resources that fall within the resource selection window. In some aspects, the PHY layer may follow an existing procedure for resource selection and report the set of candidate sidelink resources to the higher layer of UE 402. As shown by reference number 710, the PHY layer may provide the set of sidelink resources to the higher layer of UE 402.

As shown by reference number 715, the higher layer may select sidelink resources based at least in part on information about the DRX cycle of UE 404 (and a DRX cycle of UE 402, if applicable). In some aspects, the higher layer of UE 402 may select resources from the candidate set of sidelink resources such that the initial transmission and, potentially, one or more retransmissions are in the DRX active time of UE 404 or of one or more UEs associated with a destination ID.

As shown by reference number 720, the higher layer of UE 402 may cause the PHY layer of UE 402 to transmit a communication that includes a sidelink resource reservation of the sidelink resources to UE 404, or to one or more UEs associated with a destination ID. In some aspects, the higher layer of UE 402 may cause the PHY layer of UE 402 to transmit a sidelink communication (e.g., data, SCI) using a selected sidelink resource. By utilizing DRX cycle information for sidelink resource selection, UE 402 may avoid communications while UE 404 is asleep and conserve processing resources and signaling resources.

As indicated above, FIG. 7 is provided as an example. Other examples may differ from what is described with regard to FIG. 7.

Figure 8:
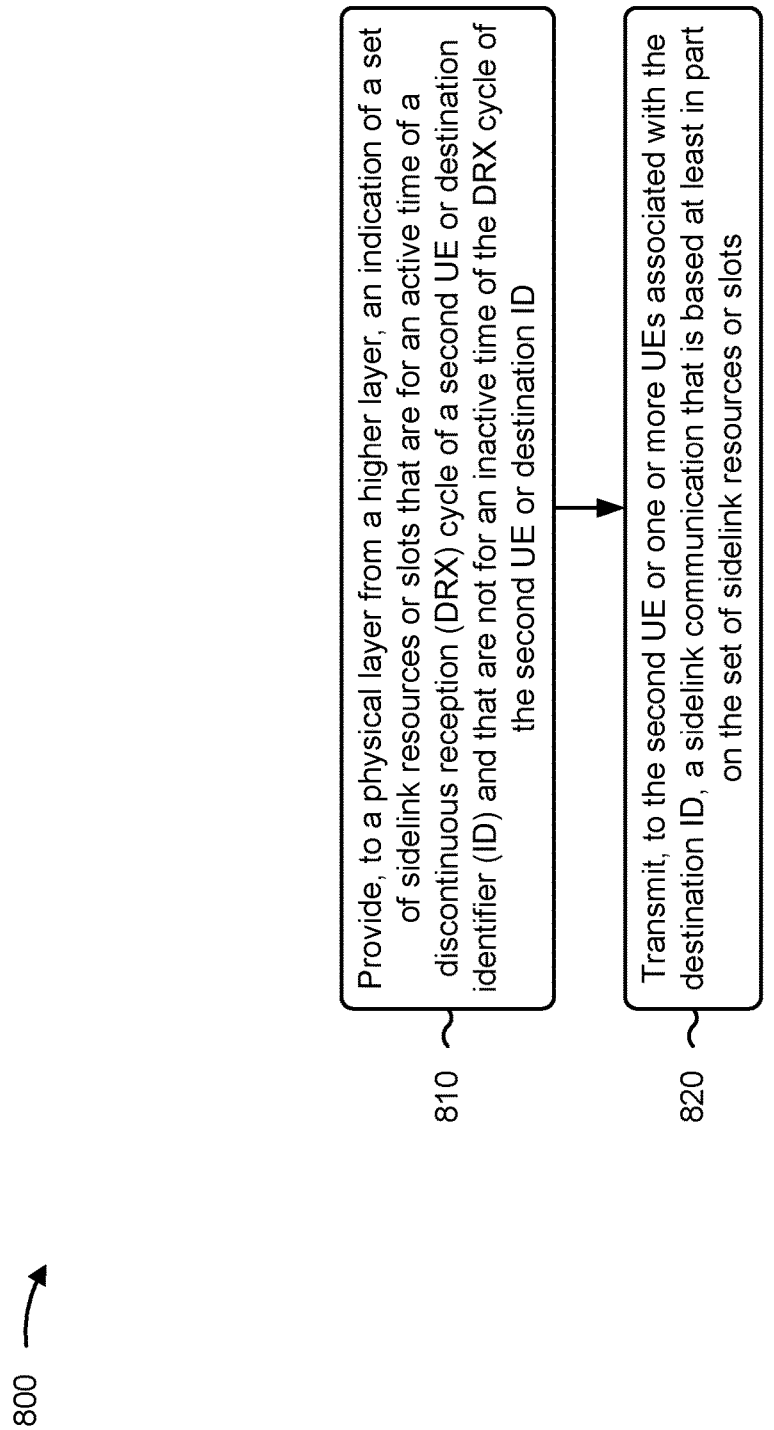
FIG. 8 is a diagram illustrating an example process performed, for example, by a first UE, in accordance with the present disclosure.

FIG. 8 is a diagram illustrating an example process 800 performed, for example, by a first UE, in accordance with the present disclosure. Example process 800 is an example where the first UE (e.g., UE 120, UE 402) performs operations associated with sidelink resource selection for DRX.

As shown in FIG. 8, in some aspects, process 800 may include providing, to a physical layer from a higher layer, an indication of a set of sidelink resources or slots that are for an active time of a DRX cycle of a second UE or destination ID and that are not for an inactive time of the DRX cycle of the second UE or destination ID (block 810). For example, the first UE (e.g., using communication manager 140 and/or resource provision component 1008 depicted in FIG. 10) may provide, to a physical layer from a higher layer, an indication of a set of sidelink resources or slots that are for an active time of a DRX cycle of a second UE or destination ID and that are not for an inactive time of the DRX cycle of the second UE or destination ID, as described above in connection with FIG. 5 and FIG. 6.

As further shown in FIG. 8, in some aspects, process 800 may include transmitting, to the second UE or one or more UEs associated with the destination ID, a sidelink communication that is based at least in part on the set of sidelink resources or slots (block 820). For example, the first UE (e.g., using communication manager 140 and/or transmission component 1004 depicted in FIG. 10) may transmit, to the second UE or one or more UEs associated with the destination ID, a sidelink communication that is based at least in part on the set of sidelink resources or slots, as described above in connection with FIG. 5 and FIG. 6.

Process 800 may include additional aspects, such as any single aspect or any combination of aspects described below and/or in connection with one or more other processes described elsewhere herein.

In a first aspect, the sidelink communication includes a data communication that is scheduled for a sidelink resource within the set of sidelink resources or slots.

In a second aspect, alone or in combination with the first aspect, the sidelink communication includes SCI that indicates a sidelink resource reservation within the set of sidelink resources.

In a third aspect, alone or in combination with one or more of the first and second aspects, process 800 includes using sidelink resources in the set of sidelink resources as an initial set of candidate sidelink resources for sidelink resource selection.

In a fourth aspect, alone or in combination with one or more of the first through third aspects, process 800 includes using, for sidelink resource selection, sidelink resources that are both within the set of sidelink resources or slots and within a resource selection window as an initial set of candidate sidelink resources.

In a fifth aspect, alone or in combination with one or more of the first through fourth aspects, the indication of the set of sidelink resources or slots identifies one or more sidelink resources.

In a sixth aspect, alone or in combination with one or more of the first through fifth aspects, the indication of the set of sidelink resources or slots indicates one or more ranges of slots.

In a seventh aspect, alone or in combination with one or more of the first through sixth aspects, the indication of the set of sidelink resources or slots indicates one or more ranges of time points.

In an eighth aspect, alone or in combination with one or more of the first through seventh aspects, providing the set of sidelink resources or slots includes providing the set of sidelink resources or slots per priority of a transmission.

In a ninth aspect, alone or in combination with one or more of the first through eighth aspects, the set of sidelink resources or slots applies to a subset of transmissions.

In a tenth aspect, alone or in combination with one or more of the first through ninth aspects, the subset of transmissions is configured or preconfigured per resource pool or indicated via an RRC message.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
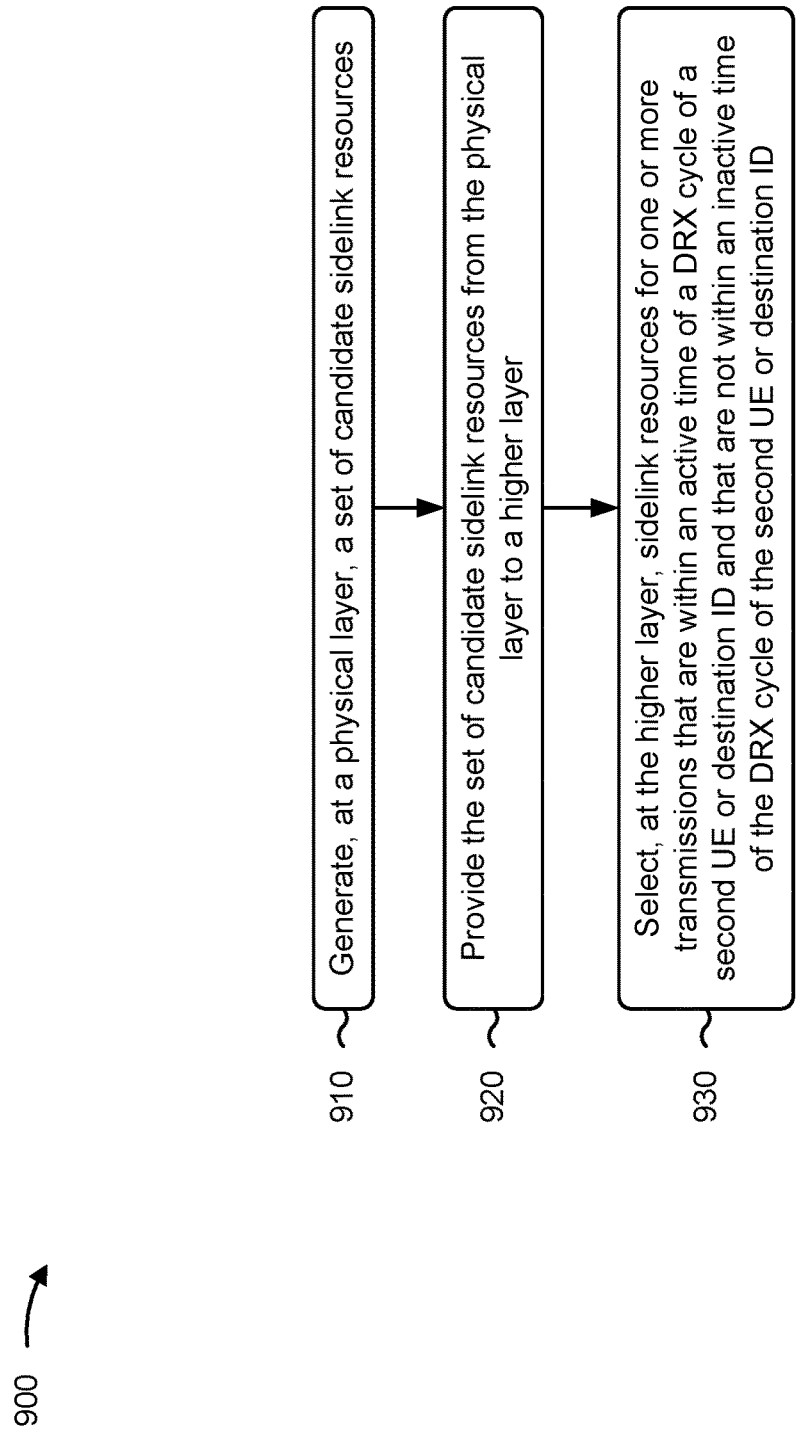
FIG. 9 is a diagram illustrating an example process performed, for example, by a first UE, in accordance with the present disclosure.

FIG. 9 is a diagram illustrating an example process 900 performed, for example, by a first UE, in accordance with the present disclosure. Example process 900 is an example where the first UE (e.g., UE 120, UE 402) performs operations associated with sidelink resource selection for DRX.

As shown in FIG. 9, in some aspects, process 900 may include generating, at a physical layer, a set of candidate sidelink resources (block 910). For example, the first UE (e.g., using communication manager 140 and/or generation component 1108 depicted in FIG. 11) may generate, at a physical layer, a set of candidate sidelink resources, as described above in connection with FIGS. 5-7.

As further shown in FIG. 9, in some aspects, process 900 may include providing the set of candidate sidelink resources from the physical layer to a higher layer (block 920). For example, the first UE (e.g., using communication manager 140 and/or resource provision component 1110 depicted in FIG. 11) may provide the set of candidate sidelink resources from the physical layer to a higher layer, as described above in connection with FIGS. 5-7.

As further shown in FIG. 9, in some aspects, process 900 may include selecting, at the higher layer, sidelink resources for one or more transmissions that are within an active time of a DRX cycle of a second UE or destination ID and that are not within an inactive time of the DRX cycle of the second UE or destination ID (block 930). For example, the UE (e.g., using communication manager 140 and/or selection component 1112 depicted in FIG. 11) may select, at the higher layer, sidelink resources for one or more transmissions that are within an active time of a DRX cycle of a second UE or destination ID and that are not within an inactive time of the DRX cycle of the second UE or destination ID, as described above in connection with FIGS. 5-7.

Process 900 may include additional aspects, such as any single aspect or any combination of aspects described below and/or in connection with one or more other processes described elsewhere herein.

In a first aspect, process 900 includes transmitting, to the second UE or one or more UEs associated with the destination ID, a sidelink communication that is based at least in part on the set of sidelink resources.

In a second aspect, alone or in combination with the first aspect, the sidelink communication includes a data communication that is scheduled for a sidelink resource within the set of sidelink resources.

In a third aspect, alone or in combination with one or more of the first and second aspects, the sidelink communication includes SCI that indicates a sidelink resource reservation within the set of sidelink resources.

In a fourth aspect, alone or in combination with one or more of the first through third aspects, the set of sidelink resources applies to a subset of transmissions.

In a fifth aspect, alone or in combination with one or more of the first through fourth aspects, the subset of transmissions is configured or preconfigured per resource pool or indicated via an RRC message.

In a sixth aspect, alone or in combination with one or more of the first through fifth aspects, selecting the sidelink resources includes selecting the sidelink resources based at least in part on a priority of a transmission.

In a seventh aspect, alone or in combination with one or more of the first through sixth aspects, the one or more transmissions includes an initial transmission.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
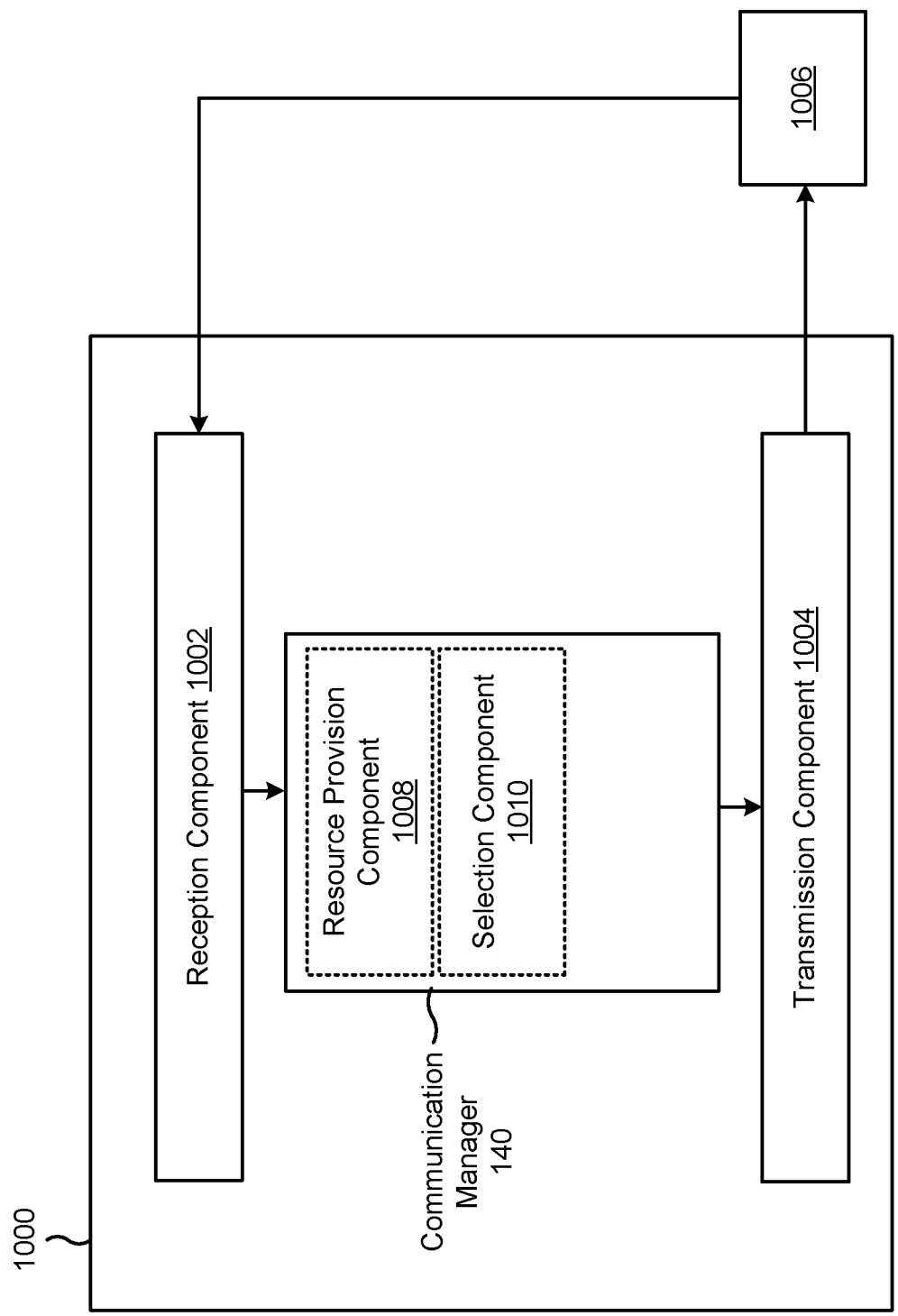
FIGS. 10-11 are block diagrams of example apparatuses for wireless communication, in accordance with the present disclosure.

FIG. 10 is a diagram of an example apparatus 1000 for wireless communication. The apparatus 1000 may be a first UE (e.g., UE 120, UE 402), or a first UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include a resource provision component 1008 and/or a selection component 1010, among other examples.

In some aspects, the apparatus 1000 may be configured to perform one or more operations described herein in connection with FIGS. 1-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the first UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the first UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the first UE described in connection with FIG. 2. In some aspects, the transmission component 1004 may be co-located with the reception component 1002 in a transceiver.

The resource provision component 1008 may provide, to a physical layer from a higher layer, an indication of a set of sidelink resources or slots that are for an active time of a DRX cycle of a second UE or destination ID and that are not for an inactive time of the DRX cycle of the second UE or destination ID. The transmission component 1004 may transmit, to the second UE or one or more UEs associated with the destination ID, a sidelink communication that is based at least in part on the set of sidelink resources or slots.

The selection component 1010 may use the set of sidelink resources as an initial set of candidate sidelink resources for sidelink resource selection. The selection component 1010 may use, for sidelink resource selection, sidelink resources that are both within the set of sidelink resources or slots and within a resource selection window as an initial set of candidate sidelink resources.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
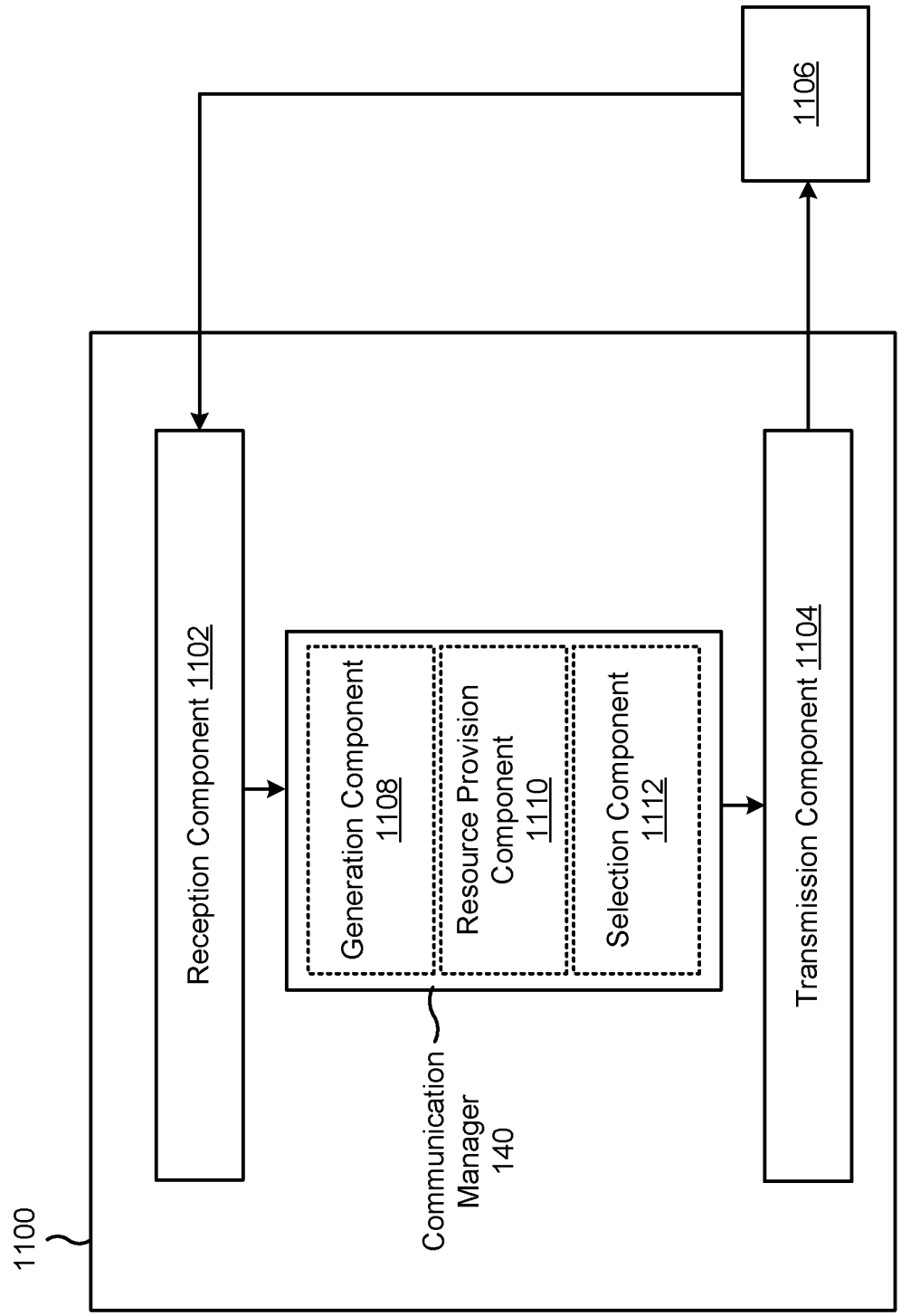

FIG. 11 is a diagram of an example apparatus 1100 for wireless communication. The apparatus 1100 may be a first UE (e.g., UE 120, UE 402), or a first UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a generation component 1108, a resource provision component 1110, or a selection component 1112, among other examples.

In some aspects, the apparatus 1100 may be configured to perform one or more operations described herein in connection with FIGS. 1-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the first UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the first UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the first UE described in connection with FIG. 2. In some aspects, the transmission component 1104 may be co-located with the reception component 1102 in a transceiver.

The generation component 1108 may generate, at a physical layer, a set of candidate sidelink resources. The resource provision component 1110 may provide the set of candidate sidelink resources from the physical layer to a higher layer. The selection component 1112 may select, at the higher layer, sidelink resources for one or more transmissions that are within an active time of a DRX cycle of a second UE or destination ID and that are not within an inactive time of the DRX cycle of the second UE or destination ID.

The transmission component 1104 may transmit, to the second UE or one or more UEs associated with the destination ID, a sidelink communication that is based at least in part on the set of sidelink resources.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a first user equipment (UE), comprising: providing, to a physical layer from a higher layer, an indication of a set of sidelink resources or slots that are for an active time of a discontinuous reception (DRX) cycle of a second UE or destination identifier (ID) and that are not for an inactive time of the DRX cycle of the second UE or destination ID; and transmitting, to the second UE or one or more UEs associated with the destination ID, a sidelink communication that is based at least in part on the set of sidelink resources or slots.

Aspect 2: The method of Aspect 1, wherein the sidelink communication includes a data communication that is scheduled for a sidelink resource within the set of sidelink resources or slots.

Aspect 3: The method of Aspect 1 or 2, wherein the sidelink communication includes sidelink control information that indicates a sidelink resource reservation within the set of sidelink resources.

Aspect 4: The method of any of Aspects 1-3, further comprising using sidelink resources in the set of sidelink resources as an initial set of candidate sidelink resources for sidelink resource selection.

Aspect 5: The method of any of Aspects 1-4, further comprising using, for sidelink resource selection, sidelink resources that are both within the set of sidelink resources or slots and within a resource selection window as an initial set of candidate sidelink resources.

Aspect 6: The method of any of Aspects 1-5, wherein the indication of the set of sidelink resources or slots identifies one or more sidelink resources.

Aspect 7: The method of any of Aspects 1-6, wherein the indication of the set of sidelink resources or slots indicates one or more ranges of slots.

Aspect 8: The method of any of Aspects 1-7, wherein the indication of the set of sidelink resources or slots indicates one or more ranges of time points.

Aspect 9: The method of any of Aspects 1-8, wherein providing the set of sidelink resources or slots includes providing the set of sidelink resources or slots per priority of a transmission.

Aspect 10: The method of any of Aspects 1-9, wherein the set of sidelink resources or slots applies to a subset of transmissions.

Aspect 11: The method of Aspect 10, wherein the subset of transmissions is configured or preconfigured per resource pool or indicated via a radio resource control message.

Aspect 12: A method of wireless communication performed by a first user equipment (UE), comprising: generating, at a physical layer, a set of candidate sidelink resources; providing the set of candidate sidelink resources from the physical layer to a higher layer; and selecting, at the higher layer, sidelink resources for one or more transmissions that are within an active time of a discontinuous reception (DRX) cycle of a second UE or destination identifier (ID) and that are not within an inactive time of the DRX cycle of the second UE or destination ID.

Aspect 13: The method of Aspect 12, further comprising transmitting, to the second UE or one or more UEs associated with the destination ID, a sidelink communication that is based at least in part on the set of sidelink resources.

Aspect 14: The method of Aspect 13, wherein the sidelink communication includes a data communication that is scheduled for a sidelink resource within the set of sidelink resources.

Aspect 15: The method of Aspect 13 or 14, wherein the sidelink communication includes sidelink control information that indicates a sidelink resource reservation within the set of sidelink resources.

Aspect 16: The method of any of Aspects 12-15, wherein the set of sidelink resources applies to a subset of transmissions.

Aspect 17: The method of Aspect 16, wherein the subset of transmissions is configured or preconfigured per resource pool or indicated via a radio resource control message.

Aspect 18: The method of any of Aspects 12-17, wherein selecting the sidelink resources includes selecting the sidelink resources based at least in part on a priority of a transmission.

Aspect 19: The method of any of Aspects 12-18, wherein the one or more transmissions includes an initial transmission.

Aspect 20: An apparatus for wireless communication at a device, comprising a processor; memory coupled with the processor; and instructions stored in the memory and executable by the processor to cause the apparatus to perform the method of one or more of Aspects 1-19.

Aspect 21: A device for wireless communication, comprising a memory and one or more processors coupled to the memory, the one or more processors configured to perform the method of one or more of Aspects 1-19.

Aspect 22: An apparatus for wireless communication, comprising at least one means for performing the method of one or more of Aspects 1-19.

Aspect 23: A non-transitory computer-readable medium storing code for wireless communication, the code comprising instructions executable by a processor to perform the method of one or more of Aspects 1-19.

Aspect 24: A non-transitory computer-readable medium storing a set of instructions for wireless communication, the set of instructions comprising one or more instructions that, when executed by one or more processors of a device, cause the device to perform the method of one or more of Aspects 1-19.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
    a memory; and
    one or more processors, coupled to the memory, configured to:
        provide, to a physical layer from a higher layer, an indication of a set of sidelink resources or slots that are for an active time of a discontinuous reception (DRX) cycle of a second UE and that are not for an inactive time of the DRX cycle of the second UE; and
        transmit, to the second UE, a sidelink communication that is based at least in part on the set of sidelink resources or slots.

2. The first UE of claim 1, wherein the sidelink communication includes a data communication that is scheduled for a sidelink resource within the set of sidelink resources or slots.

3. The first UE of claim 1, wherein the sidelink communication includes sidelink control information that indicates a sidelink resource reservation within the set of sidelink resources or slots.

4. The first UE of claim 1, wherein the one or more processors are configured to use sidelink resources in the set of sidelink resources or slots as an initial set of candidate sidelink resources for sidelink resource selection.

5. The first UE of claim 1, wherein the one or more processors are configured to use, for sidelink resource selection, sidelink resources that are both within the set of sidelink resources or slots and within a resource selection window as an initial set of candidate sidelink resources.

6. The first UE of claim 1, wherein the indication of the set of sidelink resources or slots identifies one or more sidelink resources.

7. The first UE of claim 1, wherein the indication of the set of sidelink resources or slots indicates one or more ranges of slots.

8. The first UE of claim 1, wherein the indication of the set of sidelink resources or slots indicates one or more ranges of time points.

9. The first UE of claim 1, wherein the one or more processors, to provide the set of sidelink resources or slots, are configured to provide the set of sidelink resources or slots per priority of a transmission.

10. The first UE of claim 1, wherein the set of sidelink resources or slots applies to a subset of transmissions.

11. The first UE of claim 10, wherein the subset of transmissions is configured or preconfigured per resource pool or indicated via a radio resource control message.

12. A first user equipment (UE) for wireless communication, comprising:
a memory; and
one or more processors, coupled to the memory, configured to:
generate, at a physical layer, a set of candidate sidelink resources;
provide the set of candidate sidelink resources from the physical layer to a higher layer; and
select, at the higher layer, sidelink resources for one or more transmissions that are within an active time of a discontinuous reception (DRX) cycle of a second UE and that are not within an inactive time of the DRX cycle of the second UE.

13. The first UE of claim 12, wherein the one or more processors are configured to transmit, to the second UE, a sidelink communication that is based at least in part on the set of sidelink resources.

14. The first UE of claim 13, wherein the sidelink communication includes a data communication that is scheduled for a sidelink resource within the set of sidelink resources.

15. The first UE of claim 13, wherein the sidelink communication includes sidelink control information that indicates a sidelink resource reservation within the set of sidelink resources.

16. The first UE of claim 12, wherein the set of sidelink resources applies to a subset of transmissions.

17. The first UE of claim 16, wherein the subset of transmissions is configured or preconfigured per resource pool or indicated via a radio resource control message.

18. The first UE of claim 12, wherein the one or more processors, to select the sidelink resources, are configured to select the sidelink resources based at least in part on a priority of a transmission.

19. The first UE of claim 12, wherein the one or more transmissions includes an initial transmission.

20. A method of wireless communication performed by a first user equipment (UE), comprising:
providing, to a physical layer from a higher layer, an indication of a set of sidelink resources or slots that are for an active time of a discontinuous reception (DRX) cycle of a second UE and that are not for an inactive time of the DRX cycle of the second UE; and
transmitting, to the second UE, a sidelink communication that is based at least in part on the set of sidelink resources or slots.

21. The method of claim 20, wherein the sidelink communication includes a data communication that is scheduled for a sidelink resource within the set of sidelink resources or slots.

22. The method of claim 20, wherein the sidelink communication includes sidelink control information that indicates a sidelink resource reservation within the set of sidelink resources or slots.

23. The method of claim 20, wherein the indication of the set of sidelink resources or slots identifies one or more sidelink resources.

24. The method of claim 20, wherein the indication of the set of sidelink resources or slots indicates one or more ranges of slots.

25. The method of claim 20, wherein the indication of the set of sidelink resources or slots indicates one or more ranges of time points.

26. The method of claim 20, wherein the set of sidelink resources or slots applies to a subset of transmissions.

27. A method of wireless communication performed by a first user equipment (UE), comprising:
generating, at a physical layer, a set of candidate sidelink resources;
providing the set of candidate sidelink resources from the physical layer to a higher layer; and
selecting, at the higher layer, sidelink resources for one or more transmissions that are within an active time of a discontinuous reception (DRX) cycle of a second UE and that are not within an inactive time of the DRX cycle of the second UE.

28. The method of claim 27, further comprising transmitting, to the second UE, a sidelink communication that is based at least in part on the set of sidelink resources.

29. The method of claim 28, wherein the sidelink communication includes a data communication that is scheduled for a sidelink resource within the set of sidelink resources.

30. The method of claim 28, wherein the sidelink communication includes sidelink control information that indicates a sidelink resource reservation within the set of sidelink resources.

* * * * *